Figure 1:
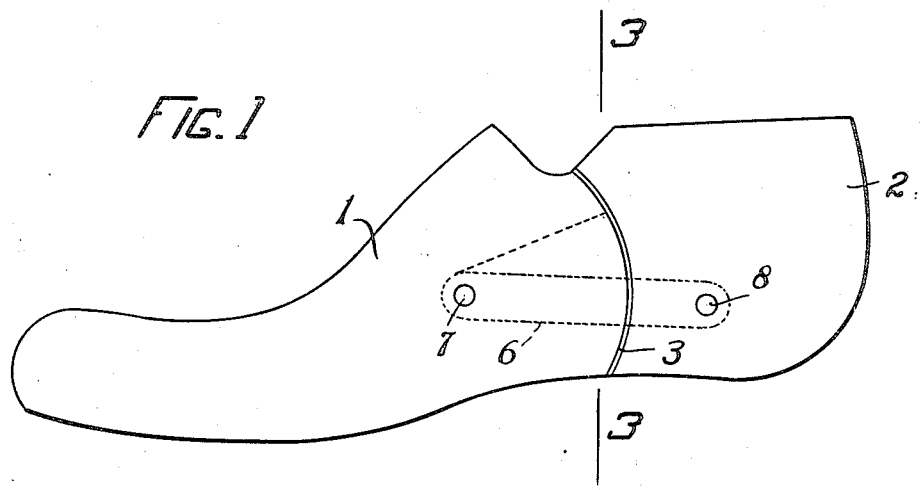

G. E. BELCHER.
LAST.
APPLICATION FILED JAN. 24, 1914.

1,134,503.

Patented Apr. 6, 1915.

WITNESSES
Agnes V. O'Connell.
Victoria Lowden

INVENTOR
GEORGE E. BELCHER
BY
Ellis Spear Jr.
ATT'Y.

UNITED STATES PATENT OFFICE.

GEORGE E. BELCHER, OF STOUGHTON, MASSACHUSETTS.

LAST.

1,134,503.  Specification of Letters Patent.  Patented Apr. 6, 1915.

Application filed January 24, 1914. Serial No. 814,208.

*To all whom it may concern:*

Be it known that I, GEORGE E. BELCHER, a citizen of the United States, residing at Stoughton, county of Norfolk, Commonwealth of Massachusetts, have invented certain new and useful Improvements in Lasts, of which the following is a specification.

This invention relates to lasts and, particularly to a so called divided last in which the two parts or members move on each other with a bearing formed by a dividing cut. In most of these lasts the block is turned to the desired shape and size but the length is made greater than that desired in the finished last on account of the shortening effect of the sawing apart of the two parts. Even where the length was carefully estimated, the saw cut could not be depended upon to restore the last to the desired length as the thickness of any particular saw blade, the set of its teeth and the lateral vibration of the blade under any particular set of conditions, are all sources of variation of the width of the kerf. These parts are frequently divided on a curved line so as to give a curved bearing and the sawing even though done upon jigs is very apt to develop slight irregularities and roughness. These irregularities, even though slight, are sufficient to cause an interlocking when the connecting parts of the last are drawn up. This drawing up of the last is an important and complicating factor. The last parts must be drawn up firmly against each other and yet this firmness is apt to introduce so great a friction that the last can not be operated by hand. Heretofore it has been necessary to either smooth off the surfaces of these cuts or to leave a certain amount of looseness in the joint in order to make it possible to collapse the last in use. I overcome both of these difficulties by interposing between the coöperating bearing faces of the last parts a smooth facing plate having substantially the thickness of the cut. This makes it possible to turn the last to the exact length desired in the finished article in the first instance and it obviates the necessity for any over length. The plate is preferably yieldably attached to the face of one of the last parts and is of a material having a relatively high degree of resiliency so as to automatically accommodate itself to and compensate for irregularities in the cut. This relieves friction between the last parts and obviates that interlocking tendency so noticeable where any irregularities in the cut have developed.

The construction and principle of my invention will be more fully disclosed in the specification which follows.

In the drawings which form a part of that specification, I have shown as an illustrative embodiment a form of plate which has proven well adapted to the requirements of practice and manufacture.

Figure 2:
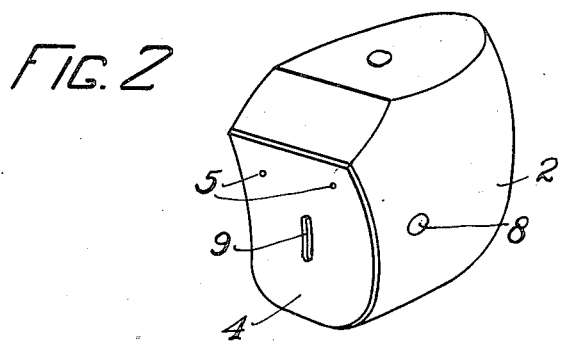
Figure 3:
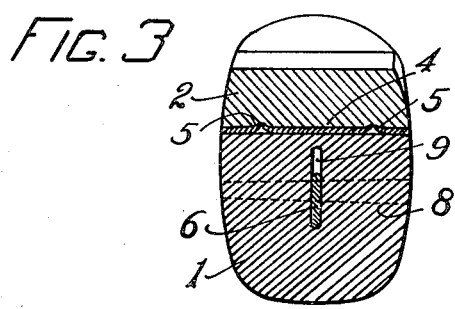

Throughout specification and drawings like reference numerals are correspondingly applied and in these drawings, Figure 1 is a side view of a so called divided last in accordance with my invention, Fig. 2 is a perspective view of the heel part of the last showing my face plate in position, and Fig. 3 is a vertical section on the line 3—3 of Fig. 1.

I have indicated at 1 and 2 the toe and heel parts respectively of a so called divided last. As explained, the last block is turned to the desired shape and size as usual. Instead however of making the length greater than that desired for the finished last as has heretofore been done in order to compensate in a measure for the shortening effect of the sawing apart of the last sections, I make the last of the required length in the turning step and compensate for the saw cut 3 by the interposition of a smooth, hard but resilient face plate 4. These plates are selected of a gage which is practically exactly that of the width of the kerf made by the saw which is being run at the time. In the embodiment shown in the drawings, the saw cut is represented along a curved line of severance having the pivot pin 7 of the link 6 as its approximate center and extending from top to bottom of the last block. This provides for a curved bearing between the opposed faces of the two last parts. As explained, under ordinary conditions there is apt to be an interlocking tendency of the last parts in their relative movement upon each other due to the presence of slight irregularities in the cut developed by carelessness of the workman or by vibration of the saw or last while severing the parts. To relieve the undue friction which would naturally develop from the presence of such irregularities, the resilient face plate 4 is yieldably attached to the bearing face of one of the last parts in any suitable manner. In the drawings the plate is shown as applied to the heel part 2. As a convenient means for so attaching the face plate, I have indicated at 5 two tangs which are formed by striking up the metal of the plate and which are embedded in the wood of the heel part. This construction permits a compensating action by the plate which overcomes the faults arising from the irregularities in the cut and the changes in relative positioning of these irregularities when the parts of the last are moved in use. The last part may be joined by any suitable union. As a convenient form I have shown a link 6 pivoted at 7 in a vertical kerf in the fore part and fixed at 8 in the heel part, the plate 4 having a slot 9 through which the link passes. The link is fixed in the heel part by a taper pin 8 which is driven while the fore and heel parts are longitudinally compressed. The plate 4 therefore constitutes a facing and bearing for the two last parts and tends to relieve the friction which often becomes so pronounced as to make the "breaking down" of a divided last difficult and sometimes impossible so that the last has to be taken apart and readjusted. With my invention it is possible to turn the last to the proper length required in the initial operation, and the tendency of the last parts to interlock and bind one upon the other, due to the presence of irregularities and roughness in the cut, is obviated.

In assembling a last made in accordance with my present invention, the block is first put on a lathe and turned to the exact shape and length desired in the finished article. The block is then removed and divided transversely by the saw cut 3. The vertical kerfs in which the link guides are also sawed at this time and the holes for the pivot and taper pins are bored through. The resilient plate is next applied to the heel part and the pivot pin and link set up in the toe part. The taper pin is now driven home to force the link in the heel part, the fore and heel parts being subjected to a longitudinal compression. This draws up the link and brings the last parts together. In the usual last this drawing up often proved a source of annoyance since it was necessary that the last parts be drawn up firmly and yet not produce so great a friction as to prevent manual operation of the last. With my invention friction is materially reduced by the use of the resilient facing and this facing also has a compensating action which overcomes the faults arising from irregularities in the saw cut.

Various changes in the form, material and location of the plate and other parts may obviously be made within the limits of the appended claims.

What I therefore claim and desire to secure by Letters Patent is:

1. In a last a fore part and a heel part formed from an integral block severed by a transverse cut and a facing plate attached to the face of one of said members, said plate being substantially of the thickness of the cut.

2. In a last a fore part and a heel part formed from an integral block severed by a transverse cut, and a facing plate loosely attached to the face of one of said members, said plate being substantially of the thickness of the cut.

3. In a last a fore part and a heel part formed from an integral block severed by a transverse cut, and a resilient facing plate loosely attached to the face of one of said members, said plate being substantially of the thickness of the cut.

4. A divided last comprising fore and heel parts, and a smooth, hard facing mounted on the bearing face of one of said parts to relieve the friction between the parts.

5. A last comprising a fore part and a heel part, a connection uniting said parts in movable relation and a smooth, hard facing mounted on one face of one of said last parts to relieve the friction between the parts.

6. A last comprising a fore part and a heel part having curved coöperating faces therebetween, a link pivoted in one part and fixed in the other part, a plate interposed between said parts and attached to one of said faces and means for drawing said link against said interposed plate.

7. A last comprising a fore part and a heel part having curved coöperating faces therebetween, a link pivoted in one part and fixed in the other part, a resilient smooth plate interposed between said parts and loosely attached to one of said faces and means for drawing said link against said interposed plate.

In testimony whereof I affix my signature in presence of two witnesses.

GEORGE E. BELCHER.

Witnesses:
 MARION C. HOBBS,
 GEO. B. RAWLINGS.